United States Patent [19]

Goto et al.

[11] Patent Number: 5,472,673
[45] Date of Patent: Dec. 5, 1995

[54] EXHAUST GAS PURIFICATION DEVICE FOR AN ENGINE

[75] Inventors: Masato Goto, Susono; Satoshi Iguchi, Mishima; Kenji Katoh, Shizuoka; Tetsuro Kihara, Susono, all of Japan

[73] Assignee: Toyota Jidosha Kabushiki Kaisha, Toyota, Japan

[21] Appl. No.: 340,438

[22] Filed: Nov. 14, 1994

Related U.S. Application Data

[63] Continuation of Ser. No. 96,103, Jul. 22, 1993, abandoned.

[30] Foreign Application Priority Data

Aug. 4, 1992 [JP] Japan ................................. 4-208090

[51] Int. Cl.$^6$ ............................... F01N 3/10; B01D 53/34
[52] U.S. Cl. ........................ 422/169; 422/170; 422/171; 60/297; 60/285; 423/239.1; 423/244.01
[58] Field of Search .................................. 422/169–171; 60/277, 274, 276, 297, 285, 301; 423/239.1, 213.5, 244.01, 244.02, 244.07; 502/303; 55/385.3; 95/129, 137; 96/131, 132, 116

[56] References Cited

U.S. PATENT DOCUMENTS

| | | | |
|---|---|---|---|
| 3,795,730 | 3/1974 | Kalvinskas | 95/129 |
| 3,926,590 | 12/1975 | Aibe et al. | 95/129 |
| 4,047,895 | 9/1977 | Urban | 60/297 |
| 4,315,895 | 2/1982 | Bramer | 422/171 |
| 4,760,044 | 7/1988 | Joy, III et al. | 502/303 |
| 4,780,447 | 10/1988 | Kim et al. | 502/303 |
| 4,868,148 | 9/1989 | Henk et al. | 502/303 |
| 5,041,407 | 8/1991 | Williamson et al. | 502/303 |
| 5,116,800 | 5/1992 | Williamson et al. | 502/303 |

FOREIGN PATENT DOCUMENTS

| | | |
|---|---|---|
| 0287217 | 10/1988 | European Pat. Off. . |
| 0503882 | 3/1992 | European Pat. Off. . |
| 3502866 | 3/1986 | Germany . |
| 3509035 | 9/1986 | Germany . |
| 4008371 | 9/1990 | Germany . |
| 53-115687 | 10/1978 | Japan . |
| 62-106826 | 5/1987 | Japan . |
| 62-97630 | 5/1987 | Japan . |
| 62-117620 | 5/1987 | Japan . |
| 64-30643 | 2/1989 | Japan . |
| 156816 | 12/1989 | Japan . |
| 2149715 | 6/1990 | Japan . |
| 3135417 | 6/1991 | Japan . |
| 4-171215 | 6/1992 | Japan . |
| 5-07363 | 4/1993 | Japan . |
| 5-12863 | 7/1993 | Japan . |
| 5-01764 | 12/1993 | Japan . |

OTHER PUBLICATIONS

Patent Abstracts of Japan, vol. 014, No. 395 (M–1016), Aug. 27, 1990 & JP–A–02 149 715 (Mazda Motor Corp.) Jun. 8, 1990.

Database WPI, Section Ch, Week 8272, Derwent Publications Ltd., London, GB; Class E236, AN 87–188551 & JP–A–62 117 620 (Nippon Shokubai Kagaku) May 29, 1987 abstract.

Database WPI Section Ch, Week 8639, Derwent Publications, Ltd., London, GB; Class E36, AN 86–254801 & JP–A–61 181 538 (Matsushita Elec. Ind. KK), Aug. 14, 1986 abstract.

J. Chem. Soc., Chem. Commun., 1990, pp. 1165–1166 "No Removal by Adsorption into BaO–CuO Binary Oxides".

(List continued on next page.)

*Primary Examiner*—Robert J. Warden
*Assistant Examiner*—Hien Tran
*Attorney, Agent, or Firm*—Kenyon & Kenyon

[57] ABSTRACT

An engine comprising an exhaust passage having therein a $NO_x$ absorbent which absorbs the $NO_x$ when the air-fuel ratio of the exhaust gas flowing into the $NO_x$ absorbent is lean and releases the absorbed $NO_x$ when the air-fuel ratio of the exhaust gas flowing into the $NO_x$ absorbent becomes the stoichiometric air-fuel ratio or rich. A sulphur trapping device for trapping $SO_x$ contained in the exhaust gas is arranged in the exhaust passage upstream of the $NO_x$ absorbent.

8 Claims, 2 Drawing Sheets

OTHER PUBLICATIONS

Journal of Solid State Chemistry 91, pp. 176–179 (1991) "Formation and Decomposition of $BaCuO_{2.5}$ Prepared from a Mixture of Nitrates".

67th CATSJ Meeting Abstracts No. A9, vol. 33, No. 2, 1991, pp. 87–90 "No Removal by Absorption into Ba–Cu–O Binary Oxides".

Database WPI Section Ch, Week 8628, Derwent Publications Ltd. London, GB; Class E36, AN–86–178825 & JP–A–61 111 127 (Ebara Infilco KK) May 29, 1986 abstract.

EXHAUST GAS PURIFICATION DEVICE FOR AN ENGINE

This application is a continuation of application Ser. No. 08/096,103 filed Jul. 22, 1993, now abandoned.

BACKGROUND OF THE INVENTION

1. Field of the Invention

The present invention relates to an exhaust gas purification device for an engine.

2. Description of the Related Art

With respect to an engine in which a lean air-fuel mixture is burned, the same applicant has proposed a new type of engine in which a $NO_x$ absorbent is arranged in the exhaust passage of the engine. This $NO_x$ absorbent absorbs the $NO_x$ when the air-fuel ratio of the exhaust gas flowing into the $NO_x$ absorbent is lean, and this $NO_x$ absorbent releases the absorbed $NO_x$ when the air-fuel ratio of exhaust gas flowing into the $NO_x$ absorbent becomes rich. In this engine, the $NO_x$ produced when the lean air-fuel mixture is burned is absorbed by the $NO_x$ absorbent. The air-fuel ratio of the exhaust gas flowing into the $NO_x$ absorbent is temporarily made rich before the absorbing ability of the $NO_x$ absorbent is saturated, and at this time, the $NO_x$ is released from the $NO_x$ absorbent. In addition, at this time, the $NO_x$ thus released is reduced (See copending U.S. patent application Ser. No. 66,100 derived from PCT application JP92/01279).

However, since sulphur is contained in fuel and lubricating oil of the engine, sulphur oxides $SO_x$ is contained in the exhaust gas and, in the above-mentioned engine, $SO_x$ is absorbed in the $NO_x$ absorbent together with $NO_x$. Nevertheless, even if the air-fuel ratio of the exhaust gas flowing into the $NO_x$ absorbent is made rich, $SO_x$ thus absorbed is not released from the $NO_x$ absorbent, and thus the amount of $SO_x$ stored in the $NO_x$ absorbent is gradually increased. However, if the amount of $SO_x$ stored in the $NO_x$ absorbent is increased, the amount of $NO_x$ which the $NO_x$ absorbent is able to absorb is gradually reduced, and thus a problem arises in that $NO_x$ cannot be absorbed in the $NO_x$ absorbent.

SUMMARY OF THE INVENTION

An object of the present invention is to provide an exhaust gas purification device capable of maintaining a high absorbing ability of the $NO_x$ absorbent for a long time.

According to the present invention, there is provided an exhaust gas purification device of an engine having an exhaust passage, said device comprising: an $NO_x$ absorbent arranged in the exhaust passage and absorbing $NO_x$ when the air-fuel ratio of the exhaust gas flowing into the $NO_x$ absorbent is lean, said $NO_x$ absorbent releasing absorbed $NO_x$ when a concentration of oxygen in the exhaust gas flowing into the $NO_x$ absorbent is lowered; and sulphur trapping means arranged in the exhaust passage upstream of the $NO_x$ absorbent for trapping $SO_x$ contained in the exhaust gas.

The present invention may be more fully understood from the description of a preferred embodiment of the invention set forth below, together with the accompanying drawings.

DESCRIPTION OF A PREFERRED EMBODIMENT

Figure 1:
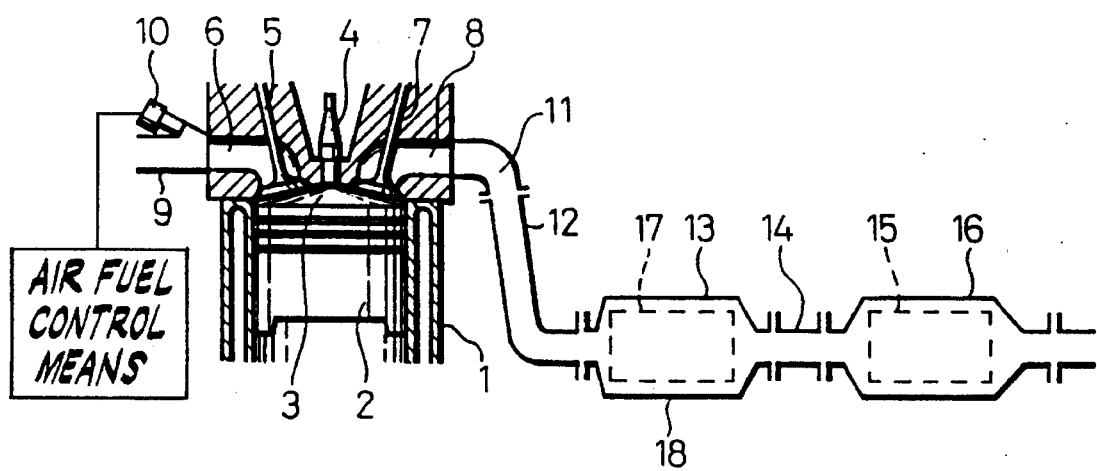
FIG. 1 is an overall view of an engine.

Referring to FIG. 1, reference numeral 1 designates an engine body, 2 a piston, 3 a combustion chamber, and 4 a spark plug; 5 designates an intake valve, 6 an intake port, 7 an exhaust valve, and 8 an exhaust port. The intake port 6 is connected to the surge tank (not shown) via a corresponding branch pipe 9, and a fuel injector 10 injecting the fuel toward the interior of the intake port 6 is attached to each branch pipe 9. The exhaust port 8 is connected to a sulphur trapping device 13 via an exhaust manifold 11 and an exhaust pipe 12, and the sulphur trapping device 13 is connected to a casing 16 including a $NO_x$ absorbent 15 via an exhaust pipe 14. In the engine illustrated in FIG. 1, the air-fuel ratio of the air-fuel mixture fed into the combustion chamber 3 is normally made lean, and thus a lean air-fuel mixture is normally burned in the combustion chamber 3.

Figure 2:
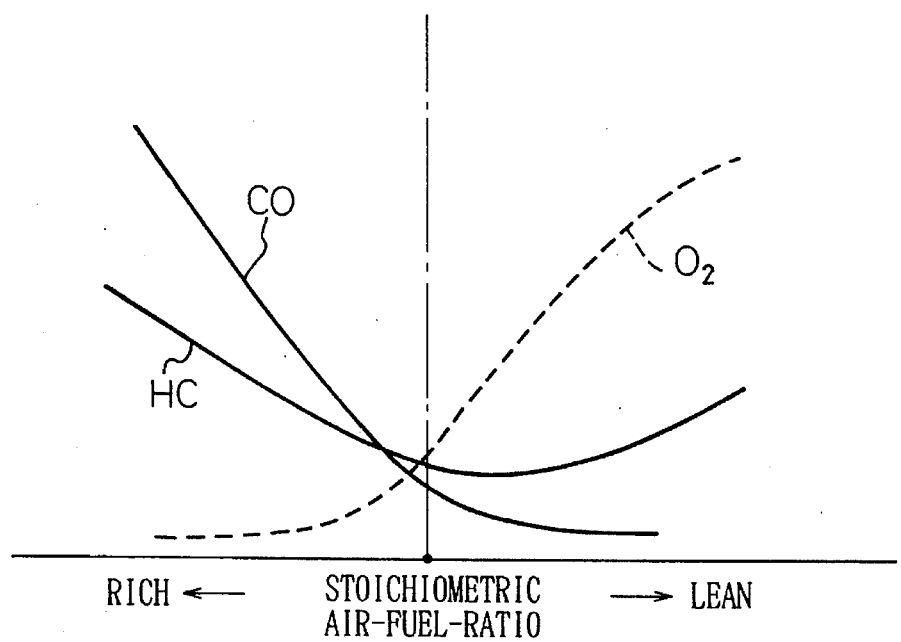
FIG. 2 is a diagram showing the concentration of unburned HC and CO and $O_2$ in the exhaust gas.

FIG. 2 schematically shows the concentration of representative components in the exhaust gas discharged from the combustion chamber 3. As seen from FIG. 2, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 15 contained in the casing 16 uses, for example, alumina as a carrier. On this carrier, at least one substance selected from alkali metals, for example, potassium K, sodium Na, lithium Li, and cesium Cs; alkali earth metals, for example, barium Ba and calcium Ca; and rare earth metals, for example, lanthanum La and yttrium Y and precious metals such as platinum Pt is carried. When referring to the ratio between the air and fuel (hydrocarbons) fed into the intake passage of the engine and the exhaust passage upstream of the $NO_x$ absorbent 15 as the air-fuel ratio of the inflowing exhaust gas to the $NO_x$ absorbent 15, this $NO_x$ absorbent 15 performs the absorption and releasing operation of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 15, the air-fuel ratio of the inflowing exhaust gas coincides with the air-fuel ratio of the air-fuel mixture fed into the combustion chamber 3, and accordingly in this case, the $NO_x$ absorbent 15 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

Figure 3A:
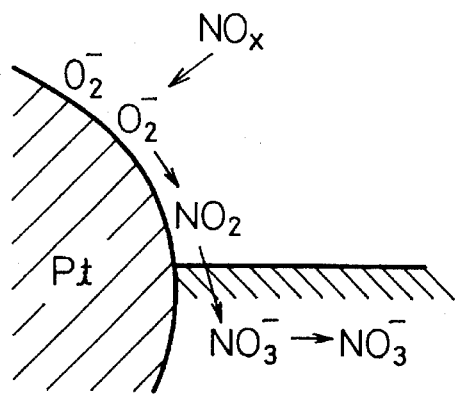
FIGS. 3A and 3B are views for explaining an absorbing and releasing operation of $NO_x$.
Figure 3B:
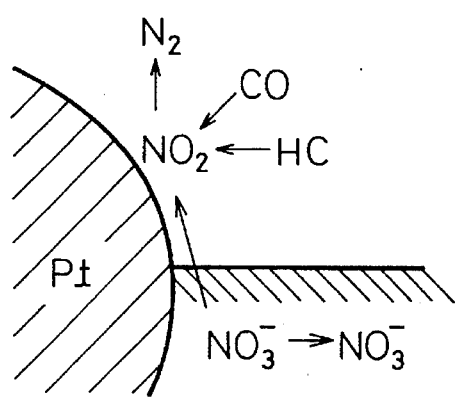

When the above-mentioned $NO_x$ absorbent 15 is disposed in the exhaust passage of the engine, this $NO_x$ absorbent 15 actually performs the absorption and releasing operation of $NO_x$, but there are areas of the exact mechanism of this absorption and releasing operation which are not clear. However, it can be considered that this absorption and releasing operation is conducted by the mechanism as shown in FIGS. 3A and 3B. This mechanism will be explained by using as an example a case where platinum Pt and barium Ba are carried on the carrier, but a similar mechanism is obtained even if another precious metal, alkali metal, alkali-earth metal, or rare-earth metal is used.

Namely, when the inflowing exhaust gas becomes very lean, the concentration of oxygen in the inflowing exhaust gas is greatly increased. At this time, as shown in FIG. 3A, the oxygen $O_2$ is deposited on the surface of the platinum Pt in the form of $O_2^-$. At this time, the NO in the inflowing exhaust gas reacts with the $O_2^-$ on the surface of the platinum Pt and becomes $NO_2(2NO+O_2 \rightarrow 2NO_2)$. Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 3A. In this way, $NO_x$ is absorbed into the $NO_x$ absorbent 15.

So long as the oxygen concentration in the inflowing exhaust gas is high, the $NO_x$ is produced on the surface of the platinum Pt, and so long as the $NO_x$ absorption ability of the absorbent is not saturated, the $NO_x$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 15. As shown in FIG. 2, when the degree of leanness of the inflowing exhaust gas becomes low, the oxygen concentration in the inflowing exhaust gas is lowered, and, as the degree of leanness of the inflowing exhaust gas decreases, the $NO_x$ is released from the $NO_x$ absorbent 15 even if the air-fuel ratio of the inflowing exhaust gas remains lean.

On the other hand, at this time, when the air-fuel ratio of the air-fuel mixture fed into the combustion chamber 3 is made rich and the air-fuel ratio of the inflowing exhaust gas becomes rich, as shown in FIG. 2, a large amount of unburnt HC and CO is discharged from the engine, and the unburnt HC and CO react with the oxygen $O_2^-$ on the platinum Pt and are oxidized. Also, when the air-fuel ratio of the inflowing exhaust gas becomes rich, the oxygen concentration in the inflowing exhaust gas is extremely lowered, and therefore the $NO_2$ is released from from the absorbent. This $NO_2$ reacts with the unburnt HC and CO as shown in FIG. 3B and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 15 in a short time.

As mentioned above, when the air-fuel ratio of the inflowing exhaust gas is made lean, $NO_x$ is absorbed in the $NO_x$ absorbent 15 and, when the air-fuel ratio of the inflowing exhaust gas is made rich, $NO_x$ is released from the $NO_x$ absorbent 15 in a short time. Accordingly, in the engine illustrated in FIG. 1, when a time period during which a lean air-fuel mixture is burned exceeds a fixed time period, the air-fuel ratio of the air-fuel mixture fed into the engine cylinder is temporarily made rich to release $NO_x$ from the $NO_x$ absorbent 15.

However, $SO_x$ is contained in the exhaust gas, and not only $NO_x$ but also $SO_x$ are absorbed in the $NO_x$ absorbent 15. The mechanism of the absorption of $SO_x$ into the $NO_x$ absorbent 15 is considered to be almost the same as the absorption mechanism of $NO_x$. Next, this absorption mechanism of $SO_x$ will be explained by using as an example a case where platinum Pt and barium Ba are carried on the carrier, as is the same manner as explaining the absorption mechanism of $NO_x$.

Namely, as mentioned above, when the air-fuel ratio of the inflowing exhaust gas is lean, the oxygen $O_2$ is deposited on the surface of the platinum Pt in the form of $O_2^-$. At this time, $SO_2$ in the inflowing exhaust gas reacts with the $O_2^-$ on the surface of the platinum Pt and becomes $SO_3$. Subsequently, a part of the produced $SO_3$ is oxidized on the platinum Pt and absorbed into the absorbent. While bonding with the barium oxide BaO, it is diffused in the absorbent in the form of sulfuric acid ions $SO_4^{2-}$, and sulfate $BASO_4$ is produced.

However, this sulfate $BASO_4$ is less easily dissociated and, even if the air-fuel ratio of the inflowing exhaust gas is made rich, this sulfate $BaSO_4$ remains as it stands without being dissociated. Accordingly, the amount of sulfate $BASO_4$ increases as time passes, and thus the amount of $NO_x$ which the $NO_x$ absorbent 15 is able to absorb is reduced as time passes.

Therefore, in the present invention, to prevent $SO_x$ from flowing into the $NO_x$ absorbent 15, the sulphur trapping device 13 is arranged in the exhaust passage upstream of the $NO_x$ absorbent 15. In this case, since the $NO_x$ absorbent 15 absorbs $SO_x$, but does not release $SO_x$, an absorbent which is similar to the $NO_x$ absorbent 15 can be used for the sulphur trapping device 13. In the embodiment illustrated in FIG. 1, the sulphur trapping device 13 comprises a $SO_x$ absorbent 17 and a casing 18 surrounding the $SO_x$ absorbent 17, and the $SO_x$ absorbent 17 uses, for example, alumina as a carrier. On this carrier, at least one substance selected from alkali metals, for example, potassium K, sodium Na, lithium Li, and cesium Cs; alkali-earth metals, for example, barium Ba and calcium Ca; and rare-earth metals, for example, lanthanum La and yttrium Y and precious metals such as platinum Pt is carried.

In this case, with respect to the $SO_x$ absorbent 17, it is not necessary to take a good absorbing and releasing operation of $NO_x$ into consideration, but it is sufficient to take only a good trapping operation of $SO_x$ into consideration, and therefore, it is preferable that the amount of the above-mentioned alkali metals, alkali earth metals or rare earth metals, contained in the $SO_x$ absorbent 17 be increased as compared to the amount of those metals contained in the $NO_x$ absorbent 15. In addition, cerium Ce may be added to the $SO_x$ absorbent 17.

Where the $SO_x$ absorbent 17 is arranged in the exhaust passage upstream of the $NO_x$ absorbent 15 as illustrated in FIG. 1, the whole $SO_x$ discharged from the engine is absorbed in the $SO_x$ absorbent 17, and the $SO_x$ absorbed in the $SO_x$ absorbent 17 is not released even if the air-fuel ratio of air-fuel mixture fed into the combustion chamber 3 is made rich. Accordingly, only $NO_x$ is absorbed in the $NO_x$ absorbent 15, and thus it is possible to prevent a $NO_x$ absorbing ability of the $NO_x$ absorbent 15 from being reduced.

Therefore, according to the present invention, it is possible to maintain a high $NO_x$ absorbing ability of the $NO_x$ absorbent 15 even if the $NO_x$ absorbent 15 is used for a long time.

While the invention has been described by reference to a specific embodiment chosen for purposes of illustration, it should be apparent that numerous modifications could be made thereto by those skilled in the art without departing from the basic concept and scope of the invention.

We claim:

1. An exhaust gas purification device for an engine comprising:

an engine;

an exhaust passage which extends from an upstream end which receives exhaust gas from the engine, to a downstream end from which exhaust gas is released;

an $NO_x$ absorbent arranged in the exhaust passage, wherein the $NO_x$ absorbent absorbs $NO_x$ contained in the exhaust gas when a concentration of oxygen in the exhaust gas flowing into the $NO_x$ absorbent is above a predetermined oxygen concentration, and wherein said $NO_x$ absorbent releases the absorbed $NO_x$ when the concentration of oxygen in the exhaust gas flowing into said $NO_x$ absorbent is lower than the predetermined oxygen concentration; and sulphur trapping means arranged in the exhaust passage upstream of said $NO_x$ absorbent for trapping $SO_x$ contained in the exhaust gas, wherein the trapped $SO_x$ is not released from the sulphur trapping means when the concentration of oxygen in the exhaust gas flowing into said sulphur trapping means is lower than the predetermined oxygen concentration so that $SO_x$ is prevented from reaching and being absorbed into the $NO_x$ absorbent.

2. An exhaust gas purification device according to claim 1, wherein said sulphur trapping means comprises a $SO_x$ absorbent which absorbs $SO_x$ therein.

3. An exhaust gas purification device according to claim 2, wherein said $SO_x$ absorbent contains at least one substance selected from alkali metals comprising potassium, sodium, lithium, cesium; alkali-earth metals comprising barium, calcium; and rare-earth metals comprising lanthanum, yttrium and contains platinum.

4. An exhaust gas purification device according to claim 3, wherein said $NO_x$ absorbent includes platinum and contains at least one substance selected from the group consisting of potassium, sodium, lithium, cesium, barium, calcium, lanthanum and yttrium, and wherein an amount of said metals contained in said $SO_x$ absorbent is larger than an amount of said metals contained in said $NO_x$ absorbent.

5. An exhaust gas purification device according to claim 1, further comprising means for controlling the concentration of oxygen in the exhaust gas so that the concentration of oxygen in the exhaust gas is above the predetermined oxygen concentration when $NO_x$ is to be absorbed in said $NO_x$ absorbent and so that the concentration of oxygen in the exhaust gas is below the predetermined oxygen concentration when $NO_x$ is to be released from said $NO_x$ absorbent, wherein the means for controlling the concentration of oxygen in the exhaust gas is coupled to the engine.

6. An exhaust gas purification device according to claim 5, wherein said means for controlling the concentration of oxygen in the exhaust gas includes means for controlling an air-fuel ratio of an air-fuel mixture fed into the engine.

7. An exhaust purification device according to claim 1, wherein said $NO_x$ absorbent includes platinum and contains at least one substance selected from the group consisting of potassium, sodium, lithium, cesium, barium, calcium, lanthanum and yttrium.

8. An exhaust gas purification device according to claim 2, wherein the $NO_x$ absorbent is arranged in a first casing and wherein the $SO_x$ absorbent is arranged in a second casing separate from the first casing.

* * * * *

UNITED STATES PATENT AND TRADEMARK OFFICE
CERTIFICATE OF CORRECTION

PATENT NO. : 5,472,673
DATED : December 5, 1995
INVENTOR(S) : Masato Goto et al.

It is certified that error appears in the above-indentified patent and that said Letters Patent is hereby corrected as shown below:

| Column | Line | |
|---|---|---|
| 4 | 13 | Change "BASO$_4$" to --BaSO$_4$--. |
| 4 | 15 | Change "BASO$_4$" to --BaSO$_4$--. |
| 4 | 19 | Change "BASO$_4$" to --BaSO$_4$--. |

Signed and Sealed this

Eighteenth Day of June, 1996

Attest:

BRUCE LEHMAN

*Attesting Officer*  *Commissioner of Patents and Trademarks*